US00RE34027E

United States Patent [19]

Nakamura et al.

[11] E Patent Number: Re. 34,027

[45] Reissued Date of Patent: Aug. 11, 1992

[54] SILICONE RUBBER-COVERED COPIER ROLL

[75] Inventors: Akito Nakamura; Junpei Sugihara, both of Ichihara, Japan

[73] Assignee: Toray Silicone Company, Ltd., Tokyo, Japan

[21] Appl. No.: 591,907

[22] Filed: Oct. 1, 1990

Related U.S. Patent Documents

Reissue of:

[64] Patent No.: 4,830,893
Issued: May 16, 1989
Appl. No.: 145,996
Filed: Jan. 20, 1988

[30] Foreign Application Priority Data

Dec. 28, 1987 [JP] Japan ..... 62-18030

[51] Int. Cl.[5] ..... B27N 5/02

[52] U.S. Cl. ..... 428/35.8; 428/391; 428/398; 428/447; 428/36.8; 528/15; 528/31; 528/32

[58] Field of Search ..... 528/31, 15, 32; 525/478; 428/358, 391, 398, 447, 36.8

[56] References Cited

U.S. PATENT DOCUMENTS 4,565,714 1/1986 Koshar ..... 528/15
4,585,669 4/1986 Eckberg ..... 528/15

*Primary Examiner*—Melvyn I. Marquis
*Attorney, Agent, or Firm*—Robert Spector

[57] ABSTRACT

The silicone rubber obtained by curing in the presence of a platinum-containing catalyst a composition comprising an organopolysiloxane containing a plurality of lower alkenyl radicals and a organohydrogensiloxane consisting essentially of $R_3SiO_{1/2}$ units, $R_2SiO$ units, RHSiO units, and $RSiO_{3/2}$ units in a specified molar ratio is uniquely suitable as the coating material for the press roll in the fixing assembly of an electrophotographic copier.

10 Claims, No Drawings

SILICONE RUBBER-COVERED COPIER ROLL

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to silicone rubber-covered rolls. More particularly, this invention relates to rolls formed by coating a roll axle with a composition that cures to form a silicone rubber having a hardness and compression set within specified limits. The rolls can be used as fixing rolls in electrophotographic copiers and paper feed rolls in facsimile machines.

2. Description of the Prior Art

A number of contact thermal fixing methods are used in electrophotographic copiers. These methods typically involve electrophotographically forming an image from a thermoplastic resin powder, usually referred to as toner, on a photoreceptor. This image is subsequently transferred to transfer paper, and the copied image is produced by melting and fusing the toner particles using a fixing element. These elements include a heated hard roll exhibiting both heat resistance and releasability, and a soft press roll, which is a typically a silicone rubber-covered roll having heat resistance, releasability, and flexibility. To fix the toner image, these two types of rolls are pressed together under a prescribed pressure, and the image-carrying transfer paper is then passed between them.

The problems that arise in these contact thermal fixing methods include creasing of the transfer paper, and blurring of the image.

The present inventors discovered the main reason for a blurred image on the transfer paper is that the optimal contact area needed for the production of a clear image cannot be maintained. Because the soft roll is continually subjected to compressive deformation, the silicone rubber layer readily undergoes compression set, which changes the contact area of the soft roll.

SUMMARY OF THE INVENTION

The present invention was developed as a consequence of the finding that the silicone rubber obtained by curing a composition comprising an organopolysiloxane containing a plurality of lower alkenyl radicals and a specific type of organohydrogenpolysiloxane in the presence of a platinum catalyst is uniquely suitable as the coating material for the soft roll of the aforementioned fixing assembly.

The object of the present invention is to provide a durable silicone rubber-covered roll, and in particular to provide a silicone rubber-covered roll which creates a clear image on the copy paper when used as a fixing roll in an electrophotographic copier.

DETAILED DESCRIPTION OF THE INVENTION

This invention provides an improved silicone rubber-covered roll for use in an electrophotographic copier, said roll comprising a roll axle and a layer of cured silicone rubber obtained by curing a composition comprising (A) 100 parts by weight of an organopolysiloxane having at least 2 silicon-bonded lower alkenyl radicals in each molecule;

(B) an organohydrogensiloxane wherein each molecule contains at least two silicon-bonded hydrogen atoms, and the amount of said organohydrogensiloxane is equivalent to a molar ratio of silicon-bonded hydrogen atoms in (B) to lower alkenyl radicals in (A) of from 0.5 to 20; and (C) a platinum-containing catalyst in a quantity providing 0.1 to 500 parts by weight of platinum metal for each 1 million weight parts of the total quantity of components (A) and (B), where the improvement is characterized by (1) selecting said cured silicone rubber from those exhibiting a hardness in the range of from 10 to 70 measured on the A scale in accordance with Japanese Industrial Standard C 2123 and a compression set of 10% or less, and (2) selecting said organohydrogensiloxane from organosiloxane copolymers comprising $R_3SiO_{1/2}$ units, $R_2SiO$ units, RHSiO units, and $RSiO_{3/2}$ units, where each R is individually selected from monovalent hydrocarbon radicals free of ethylenic unsaturation, and where from 0.5 to 50 mol % of said copolymer consists of $RSiO_{3/2}$ units.

The characterizing feature of the present curable compositions is the composition of the organohydrogensiloxane, which is responsible for the unique properties of the cured silicone rubber layer.

Cured silicone rubbers prepared using the curable compositions of this invention have a hardness value of from 10 to 70, measured on the A scale as specified in Japanese Industrial Standard (JIS) C 2123. The utility of the rubber as a covering for copier rolls will not be realized when the hardness value exceeds 70. On the other hand, compression set occurs too readily when the hardness value is below 10, resulting in the occasional appearance of creasing of the transfer paper or the appearance of a blurred image. The hardness value is preferably from 10 to 30, most preferably from 10 to 25.

The thickness of the cured silicone rubber layer is dependent upon the application of the roll, and is typically within the range of from 2 mm to 10 mm.

The composition that is cured to form the silicone rubber layer of the present rolls can be a liquid, paste, or dough at room temperature. Liquid compositions are preferred due the ease with which these compositions are processed. "Slumping" and "non-slumping" types of compositions can be used to form the cured silicone rubber layer, depending upon the method used to fabricate the layer.

The ingredients of the curable composition include but are not limited to (A) organopolysiloxanes having at least 2 lower alkenyl radicals in each molecule; (B) organosiloxane copolymers containing at least two silicon-bonded hydrogen atoms per molecule and consisting essentially of $R_3SiO_{1/2}$ units, $R_2SiO$ units, RHSiO units, and $RSiO_{3/2}$ units, where R represents a monovalent hydrocarbon radical and where from 0.5 to 50 mol % of the units are $RSiO_{3/2}$ units; and (C) a platinum-containing catalyst in a quantity providing 0.1 to 500 weight parts platinum metal for each 1 million weight parts of the total quantity of components A and B.

Component A is the principal ingredient of the curable composition, which cures by the reaction of this ingredient with component B under the catalytic activity of component C. At least 2 silicon-bonded lower alkenyl radicals must be present in each molecule of component A. These lower alkenyl radicals are exemplified by vinyl, allyl, and propenyl. These alkenyl radicals can be present at any location in the molecule, but are preferably present at least at the molecular terminals.

The molecular configuration of component A can be straight chain, branch-containing straight chain, cyclic, or network, but is preferably a straight chain consisting essentially of diorganosiloxane units. The molecules of these preferred embodiments can be slightly branched. The molecular weight of component A is not specifically restricted. Since the corresponding viscosity may range from that of a low-viscosity liquid to a very high-viscosity gum, it also is not specifically restricted; however, a viscosity of at least 100 centipoise at 25° C. is preferred in order to obtain a cured product in the form of a rubbery elastomer.

Organopolysiloxanes suitable for use as component A include but are not limited to vinylpolysiloxanes, methylvinylsiloxane-dimethylsiloxane copolymers, dimethylvinylsiloxy-terminated dimethylpolysiloxanes, dimethylvinylsiloxy-terminated dimethylsiloxane-methylphenylsiloxane copolymers, dimethylvinylsiloxy-terminated dimethylsiloxane-diphenylsiloxane-methylvinylsiloxane copolymers, trimethylsiloxy-terminated dimethylsiloxane-methylvinylsiloxane copolymers, trimethylsiloxy-terminated dimethylsiloxane-methylphenylsiloxane-methylvinylsiloxane copolymers, dimethylvinylsiloxy-terminated methyl(3,3,3-trifluoropropyl)-polysiloxanes, dimethylvinylsiloxy-terminated dimethylsiloxane-methyl(3,3,3-trifluoropropyl)siloxane copolymers, and polysiloxanes composed of $CH_2{=}CH(CH_3)_2SiO_{1/2}$ units, $(CH_3)_3SiO_{1/2}$ units, and $SiO_{4/2}$ units. Mixtures containing two or more of these organopolysiloxanes can be used as component A.

Component B is the inventive feature of the present curable compositions, and is considered responsible for the unique combination of hardness and compression set values that characterize the cured silicone rubber layer of the roll.

Component B must be an organosiloxane copolymer consisting essentially of $R_3SiO_{1/2}$ units, $R_2SiO$ units, RHSiO units, and $RSiO_{3/2}$ units wherein the $RSiO_{3/2}$ units constitute from 0.5 to 50 mol % of the copolymer. The R radicals present in each of the four different types of repeating units represent identical or different monovalent hydrocarbon or halogenated hydrocarbon radicals and are free of ethylenic unsaturation.

When the R radicals represent alkyl they can be, for example, methyl, ethyl or propyl; cycloalkyl radicals represented by R include but are not limited to cyclohexyl; aryl radicals include but are not limited to phenyl and tolyl; and the halogenated hydrocarbon radicals are represented by 3,3,3-trifluoropropyl. Of these, alkyl radicals are preferred.

Organosiloxane copolymers suitable for use as component B are readily prepared, for example, by means of the thermal equilibration reaction, in the presence of an acid catalyst, of at least one each of a diorganopolysiloxane, an organohydrogenpolysiloxane, and the cohydrolyzate prepared by the cohydrolysis of $R_3SiCl$, $R_2SiCl_2$, $RSiCl_3$, and water. The viscosity of component B is preferably 1 to 500 centipoise (0.001 to 0.5 Pa.s).

The amount of component B in the present compositions is equivalent to a molar ratio of silicon-bonded hydrogen atoms in this component to lower alkenyl radicals in component A of from 0.5 to 20. This ratio is preferably from 1 to 3. If this molar ratio falls is less than 0.5 or above 20, there will be a tendency for the silicone rubber-covered roll to undergo compression set.

Component C is a catalyst for the reaction of silicon-bonded hydrogen atoms with alkenyl radicals. Specific examples of suitable catalysts include but are not limited to chloroplatinic acid, solutions of chloroplatinic acid in an alcohol or ketone, including these solutions following aging, chloroplatinic acid-olefin complexes, chloroplatinic acid-alkenylsiloxane complexes, chloroplatinic acid-diketone complexes, platinum black, and platinum on a carrier.

The amount of component C in the present compositions is equivalent to 0.1 to 500 parts by weight of platinum or a platinum-group metal per 1 million parts by weight of the combination of components A and B. The crosslinking reaction will not proceed satisfactorily at below 0.1 part, while exceeding 500 weight parts is uneconomical. For typical applications the amount of catalyst is preferably from approximately 1 to 50 parts.

Filler can optionally be blended into liquid embodiments of present curable silicone rubber compositions in order to adjust the fluidity or improve the mechanical strength of the molding. These fillers are exemplified by reinforcing filler such as precipitated silica, fumed silica, calcined silica, and fumed titanium dioxide, as well as by non-reinforcing fillers such as quartz powder, diatomaceous earth, absestos, aluminosilicic acid, iron oxide, zinc oxide, and calcium carbonate. The fillers can be added without modification, or their surfaces may be treated with an organosilicon compound such as hexamethyldisilazane, trimethylchlorosilane, or a polydimethylsiloxane.

Furthermore, as long as the object of the invention is not adversely affected, the curable compositions can contain a small or very small quantity of one of the known additives intended to inhibit the curing reaction. Additives of this type include but are not limited to acetylenic compound, hydrazines, triazoles, phosphines, and mercaptans.

As necessary, it is also permissible to include various additives and modifiers in the present curable compositions, for example, a silicone oil in order to improve toner releasability, pigments, heat stabilizers, flame retardants, plasticizers, and organopolysiloxanes having one alkenyl radical in each molecule to lower the modulus of the cured rubber.

The silicone rubber-covered roll of the present invention can be produced using devices and methods which are themselves known for the preparation of typical silicone rubber-covered rolls. For example, the silicone rubber-covered roll of the present invention is easily prepared by mounting a roll axle in a roll-molding metal mold, flowing, pouring, or injecting a curable composition of this invention into the interior of the metal mold, and then curing the composition. A known primer can be used applied to the roll axle to improve bonding between the silicone rubber and the roll axle.

Any of the methods typically used for molding liquid silicone rubber compositions, for example, compression molding, transfer molding, or injection molding, can be used to introduce the silicone rubber composition into the interior of the metal mold and thermally cure the silicone rubber composition.

When the thermal curing temperature, that is, the molding temperature, of the silicone rubber composition is too low, the curing rate is reduced, which reduces the production rate. When this molding temperature is too high, the silicone rubber molding will tend to adhere to the interior surface of the mold, creating problems in demolding. The molding temperature will therefore generally fall within the range of from 50° to 220° C. and preferably in the range of 100° to 170° C.

The silicone rubber-covered roll of the invention can be used as a roll in various applications, including the transfer, press and cleaning rolls of electrophotographic copiers and as the paper feed roll in facsimile machines.

The following examples disclose preferred embodiments of the invention, and should not be interpreted as limiting the scope of the invention set forth in the accompanying claims. Unless otherwise specified all parts are by weight, viscosities were measured at 25° C., and Me refers to the methyl radical.

Compression set values were measured in accordance with Japanese Industrial Standard (JIS) K 6301, using a compression ratio of 25%, a heat-treatment temperature of 180° C. and a treatment time of 72 hours.

EXAMPLE 1

100 Parts of a dimethylvinylsiloxy-terminated dimethylpolysiloxane having a viscosity of 2,000 centipoise (2 Pa.s) and containing 0.23 wt % of vinyl radicals, 25 parts of fume silica having a specific surface area of 200 m2/g, 30 parts of powdered quartz and, as the organosiloxane copolymer of the present compositions, 2.1 parts of a methylhydrogen-polysiloxane having a silicon-bonded hydrogen content of 0.6 wt % and containing 21 mole percent of $Me_3SiO_{\frac{1}{2}}$ units, 21 mole percent of $Me_2SiO$ units, 47 mole percent of MeHSiO units, and 11 mole percent of MeSiO3/2 units were mixed to yield a mixture having a viscosity of 4,500 poise (450 Pa.s) at a shear rate of 10 $sec^{-1}$. A curable liquid silicone rubber composition of this invention was obtained by the addition with mixing of 0.5 part of a solution of chloroplatinic acid in isopropanol having a platinum content of 1 to wt %.

A cylindrical iron roll core was coated with a primer containing a methylvinylpolysiloxane gum, a methylphenylpolysiloxane resin, ethyl silicate, a methylhydrogenpolysiloxane, and an organotitanate ester. The primer was then cured, following which the roll core was mounted in a metal roll-molding mold. The liquid silicone rubber composition prepared as described in the preceding portion of this example was then poured into the cavity and thermally cured at 150° C. for 10 minutes.

After cooling, the resulting silicone rubber-covered roll was removed from the mold and cut with a knife to expose various regions of the cured rubber layer. The hardness, measured using the A scale in accordance with JIS 2123, of each region was 50. The compression set value of the cured rubber was 6%.

In accordance with JIS K 6301, the test method referred to in JIS C 2123, the hardness value is measured using a spring-loaded tester of a type specified in the test method. The spring is attached to a pointer which moves along a scale reading from 0 to 100 in substantially equal increments. The spring is also attached to an indentor of specified dimensions formed from a wear-resistant material and having sample contact surface with a diameter of 0.79 mm. When the pointer reads 0 on the hardness scale the indentor projects a distance of 2.54 mm, +0.00 mm and −0.05 mm, below the exposed surface of the loading disk of the tester. When the pointer reads 100 on the scale the sample contact surface is at the same level as the exposed surface of the loading disk.

In operation the sample to be evaluated is placed on a horizontal surface and in contact with the sample contact surface of the indentor, and the tester is positioned vertically with respect to the plane of the sample. The thickness of the sample must be at least 12 mm. A force of 1000 g (9,81 N.) is then applied to the tester in a downward and vertical direction with respect to the plane of the test sample until the sample contacts the exposed surface of the loading disk. The hardness value is then read from the scale.

There is a specified straight-line relationship between the amount of force exerted on the spring and the reading on the hardness scale. The force on the spring required to achieve a reading of 100 on the hardness scale is 855 g (8.379 N.). A force of up to 55 g (0.539 N.) will produce a reading of 0 on the hardness scale.

The procedure for measuring compression set involves placing the test sample in a holder consisting essentially of two steel plates that are separated by spacers measuring 9.52 mm, +0.01 mm −0.02 mm, in length. The plates are secured together by means of suitable bolts and nuts. A test sample in the form of a right cylinder measuring 12.7±0.13 mm in thickness and 29.0 mm in diameter is placed in the holder and secured in position by tightening the aforementioned bolts until the steel plates rest against the spacers. The holder and sample are then heated in a thermostatically controlled bath for 22 hours at 70±1° C. or for 70 hours at 100±1° C. and the compression set (CS) is calculated using the formula $$CS=[(t_0-t_1)/(t_0-t_2)]\times 100$$

where $t_0$ represents the initial thickness of the test sample, $t_1$ represents the thickness of the test sample 30 minutes after being removed from the sample holder and $t_2$ represents the thickness of the spacers that form part of the sample holder.

This silicone rubber-covered roll was used as a fixing roll, specifically the press roll, in an electrophotographic copier. No compression set appeared, and the duplicated image was clear.

EXAMPLE 2

A liquid silicone rubber composition was prepared by combining 100 parts of a dimethylvinylsiloxy-terminated dimethylpolysiloxane having a viscosity of 1,800 centipoise (1.8 Pa.s) and containing 0.05 wt % of vinyl radicals, 5 parts of fume silica having a specific surface area of 200 m2/g and whose surface had been previously treated with dimethyldichlorosilane, 40 parts of powdered quartz, 10 parts dimethylsilicone oil having a viscosity of 1,000 centipoise (1 Pa.s), 0.6 parts of the methylhydrogenpolysiloxane described in Example 1, and, as the curing catalyst, 2.0 parts of a dispersion of a chloroplatinic acid-methylvinylpolysiloxane complex in methylvinylpolysiloxane. The platinum content of the catalyst was 0.5 wt %. Using this curable liquid silicone rubber composition, a silicone rubber-covered roll was molded as described in Example 1.

After cooling, the resultant silicone rubber-covered roll was removed, cut with a knife, and the hardness of each exposed region was measured as described in Example 1. The hardness was 20 on the JIS A scale in all regions. The compression set of the cured rubber was 8%.

This roll was installed as the press roll in an electrophotographic copier. In this application the roll was pressed against a hard heated roll, and maintained in at a temperature of 180° C. for 100 hours. There was no evidence of compression set after being pressed for 100 hours, and the transferred image was clear.

EXAMPLE 3

A curable liquid silicone rubber composition of this invention was prepared by combining 100 parts of a methylphenylvinylsiloxy-terminated dimethylpolysiloxane having a viscosity of 3,000 centipoise (3 Pa.s) and a vinyl content of 0.18 wt %, 15 parts hexamethyldisilazane-treated fume silica, 1.5 parts of the methylhydrogenpolysiloxane described in Example 1, and 2.0 parts of the platinum catalyst described in Example 2.

A silicone rubber-covered roll of this invention was prepared and evaluated as described in the preceding in Example 1. The hardness of all regions tested was 30 on the JIS A scale. The compression set of the cured rubber was 9%. When this silicone rubber-covered roll was installed as the press roll in an electrophotographic copier, the roll did not exhibit compression set, and the duplicated image was clear.

Because the silicone rubber-covered roll of the invention is formed by covering a roll axle with a layer of a silicone rubber having a hardness in the range of 10 to 70, a compression set no greater than 10%, and which is prepared using a curable material of specified composition as described hereinbefore, the silicone rubber-covered roll is characterized by its durability and particularly by its ability to provide clear images on the copy paper when used as a press roll in electrophotographic copiers.

That which is claimed is:

1. In a silicone rubber-covered roll for use in an electrophotographic copier, said roll comprising a roll axle and a layer of silicone rubber obtained by curing a composition comprising (A) 100 parts by weight of an organopolysiloxane having at least 2 silicon-bonded lower alkenyl radicals in each molecule;

(B) an organohydrogensiloxane wherein each molecule contains at least two silicon-bonded hydrogen atoms, and the amount of said organohydrogensiloxane is equivalent to a molar ratio of silicon-bonded hydrogen atoms in (B) to lower alkenyl radicals in (A) of from 0.5 to 20; and (C) a platinum-containing catalyst in a quantity providing 0.1 to 500 parts by weight of platinum metal for each 1 million weight parts of the total quantity of components (A) and (B), the improvement characterized by (1) selecting said cured silicone rubber from those exhibiting a hardness value in the range of from 10 to 70 measured on the A scale in accordance with Japanese Industrial Standard C 2123 and a compression set of 10% or less, and (2) selecting said organohydrogensiloxane from organosiloxane copolymers comprising $R_3SiO_{\frac{1}{2}}$ units, $R_2SiO$ units, RHSiO units, and $RSiO_{3/2}$ units, where each R is individually selected from monovalent hydrocarbon or halogenated hydrocarbon radicals free of ethylenic unsaturation, and where from 0.5 to 50 mol % of said copolymer consists of $RSiO_{3/2}$ units.

2. A roll according to claim 1 where said R radicals are lower alkyl, phenyl or 3,3,3-trifluoropropyl and said hardness value is from 10 to 30.

3. A roll according to claim 2 where said R radicals are methyl, said organopolysiloxane is a dimethylvinylsiloxy-terminated dimethylpolysiloxane, said hardness value is from 10 to 25, said molar ratio is from 1 to 3, and said layer of silicone rubber is cured at a temperature of from 100 to 170° C.

4. A roll according to claim 1 where said roll is a press roll.

*5. In an improved curable composition comprising*

*(A) 100 parts by weight of an organopolysiloxane having at least 2 silicon-bonded lower alkenyl radicals in each molecule;*

*(B) an organohydrogensiloxane wherein each molecule contains at least two silicon-bonded hydrogen atoms, and the amount of said organohydrogensiloxane is equivalent to a molar ratio of silicon-bonded hydrogen atoms in (B) to lower alkenyl radicals in (A) of from 0.5 to 20; and*

*(C) a platinum-containing catalyst in a quantity providing 0.1 to 500 parts by weight of platinum metal for each 1 million weight parts of the total quantity of components (A) and (B),*

*where the improvement is characterized by selecting said organohydrogensiloxane from organosiloxane copolymers comprising $R_3SiO_{\frac{1}{2}}$ units, $R_2SiO$ units, RHSiO units, and $RSiO_{3/2}$ units, where each R is individually selected from monovalent hydrocarbon radicals free of ethylenic unsaturation, and where from 0.5 to 50 mol % of said copolymer consists of $RSiO_{3/2}$ units.*

*6. A composition according to claim 5 where said R radicals are lower alkyl, phenyl or 3,3,3-trifluoropropyl.*

*7. A composition according to claim 6 where said organohydrogensiloxane is a methylhydrogenpolysiloxane having a silicon-bonded hydrogen content of 0.6 weight percent and containing 21 mole percent of $Me_3SiO_{\frac{1}{2}}$ units, 21 mole percent of $Me_2SiO$ units, 47 mole percent of MeHSiO units and 11 mole percent of $MeSiO_{3/2}$ units, where Me represents a methyl radical.*

*8. An organosiloxane copolymer comprising $R_3SiO_{\frac{1}{2}}$ units, $R_2SiO$ units, RHSiO units, and $RSiO_{3/2}$ units, where each R is individually selected from monovalent hydrocarbon radicals free of ethylenic unsaturation, and where from 0.5 to 50 mol % of said copolymer consists of $RSiO_{3/2}$ units.*

*9. A composition according to claim 8 where said R radicals are lower alkyl, phenyl or 3,3,3-trifluoropropyl.*

*10. A composition according to claim 9 where said copolymer is a methylhydrogenpolysiloxane having a silicon-bonded hydrogen content of 0.6 weight percent and containing 21 mole percent of $Me_3SiO_{\frac{1}{2}}$ units, 21 mole percent of $Me_2SiO$ units, 47 mole percent of MeHSiO units and 11 mole percent of $MeSiO_{3/2}$ units, where Me represents a methyl radical.*

* * * * *